United States Patent [19]

Ankenman et al.

[11] 4,062,280
[45] Dec. 13, 1977

[54] BRAKE FOR TYING NEEDLES OF CROP BALER

[75] Inventors: Thomas Wayne Ankenman, Moundridge; George Yatcilla, Newton, both of Kans.

[73] Assignee: Hesston Corporation, Hesston, Kans.

[21] Appl. No.: 716,773

[22] Filed: Aug. 23, 1976

[51] Int. Cl.² .............................................. B65B 13/02
[52] U.S. Cl. .................................. 100/19 A; 188/85; 188/166
[58] Field of Search ............ 100/19 R, 19 A; 188/85, 188/166

[56] References Cited

U.S. PATENT DOCUMENTS

| | | | |
|---|---|---|---|
| 1,153,531 | 9/1915 | Adams | 100/19 A UX |
| 2,403,396 | 7/1946 | Raney | 100/19 A |
| 2,594,708 | 4/1952 | Amiet | 188/85 |
| 2,610,573 | 9/1952 | Altgelt | 100/19 A |
| 2,766,684 | 10/1956 | Newmaster | 100/19 A |
| 2,897,749 | 8/1959 | Vutz | 100/19 A |
| 3,122,991 | 3/1964 | Grillot | 100/19 A |

*Primary Examiner*—Billy J. Wilhite
*Attorney, Agent, or Firm*—Schmidt, Johnson, Hovey & Williams

[57] ABSTRACT

The shaft which drives the tying needles of a baler back and forth across the bale chamber has a cam-operated brake associated therewith for intermittent application and release of the brake at preselected points along the path of swinging travel of the needles. The cam is located at the peripheral edge of a rotary member of the brake, and a follower is rocked by the cam to, in turn, shift a non-rotating brake member away from the rotary member to thereby release the brake. A series of coil springs yieldably bias the two members into cooperating frictional interengagement to apply the brake.

22 Claims, 6 Drawing Figures

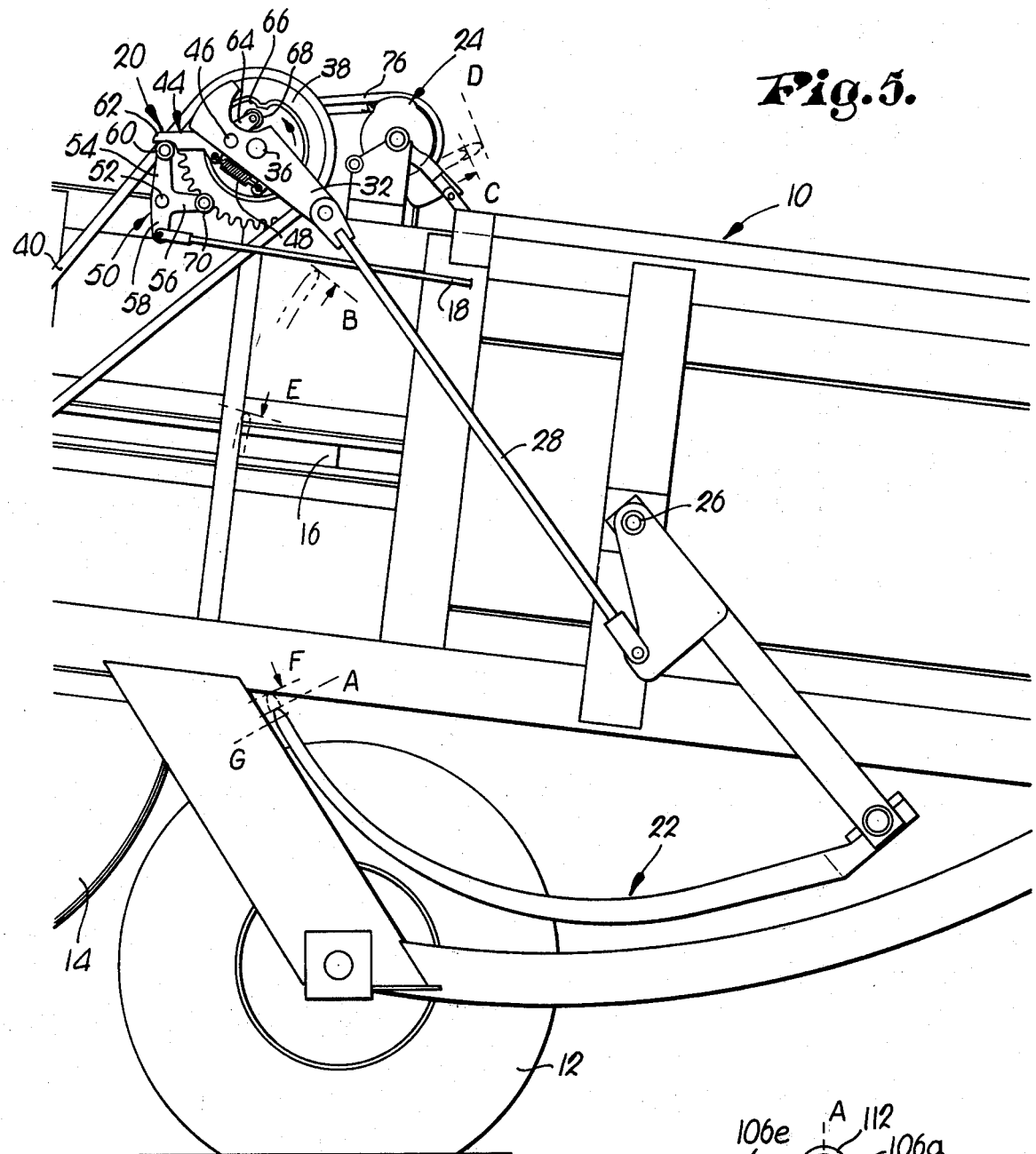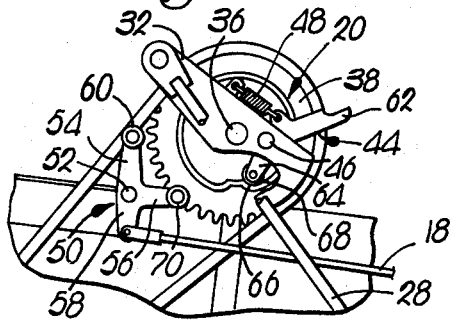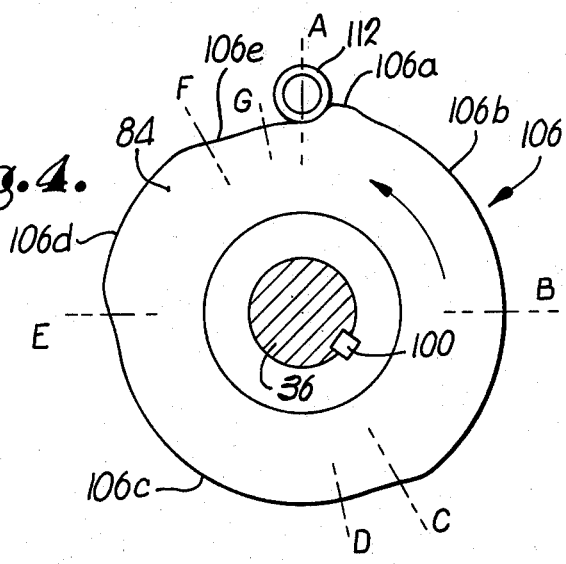

BRAKE FOR TYING NEEDLES OF CROP BALER

This invention relates to baling equipment such as, for example, that commonly used in the haymaking arts to produce compacted, densified bales of crop material. More particularly, it is directed to a way of braking the momentum of reciprocating structure on such balers at preselected intervals in their operating cycles, the present invention having particular utility for use in connection with the tying needles that swing back and forth across the bale chamber of such a machine to present a binding strand to knotting mechanism on the remote side of the bale chamber.

While it is known to be old in the art to apply braking power to such needles as they swing through their operating cycles, to the best of our knowledge, such braking has been on a continuous basis throughout the operating cycle. In other words, the brake is always applied such that the necessary braking force is available to counteract the momentum of the needles at critical points along the path of travel thereof, However, this arrangement causes undue wear of the brake and too frequent replacement of its frictionally engaging parts, both of which can occur at a most disadvantageous time, such as during the middle of a haymaking operation. Obviously, the need to replace the brake parts, coupled with malfunctions which might occur as a result of the fatigue, can present a frustrating and exasperating situation to the farmer who is always faced with the need to bale the hay as quickly as possible with but a minimum of down time. Not to be overlooked is the fact that such excessive wear leads to higher replacement costs and places the farmer at the mercy of the availability of replacement parts.

Accordingly, one important object of the present invention is to provide a way in which the brake is operated intermittently and only at those preselected points in the operating cycle of the needles or other reciprocating structure that a braking force is actually required in order to achieve optimum operation.

Another important object of the present invention is to achieve such intermittency of braking through relatively uncomplicated mechanism that advantageously makes use of components and their movements which must exist in any event if a braking action is to be effected. In this regard, it is of particular significance that one of the brake members which rotates and cooperates to apply a frictional braking force is also utilized to perform a camming action that, in turn, is used to release or apply the brake.

A further important object of this invention is to provide an intermittently operable brake, as aforesaid, which is wholly compatible with a clutch normally utilized between a source of driving power and the tying needles for actuating the latter only at certain, preselected intervals in the baling process, notwithstanding virtually continuous operation of a packing plunger or the like.

In the drawings:

FIG. 4 is a schematic view of the brake illustrating the relationship of the cam to its follower;

FIG. 5 is a fragmentary, elevational view of the baler on a reduced scale showing the tying needles, the clutch and knotting mechanism of the baler, alternative positions of the needles being indicated by broken lines; and FIG. 6 is a fragmentary, elevational view of the clutch shown after 180° of operation from its FIG. 5 position.

Figure 1:
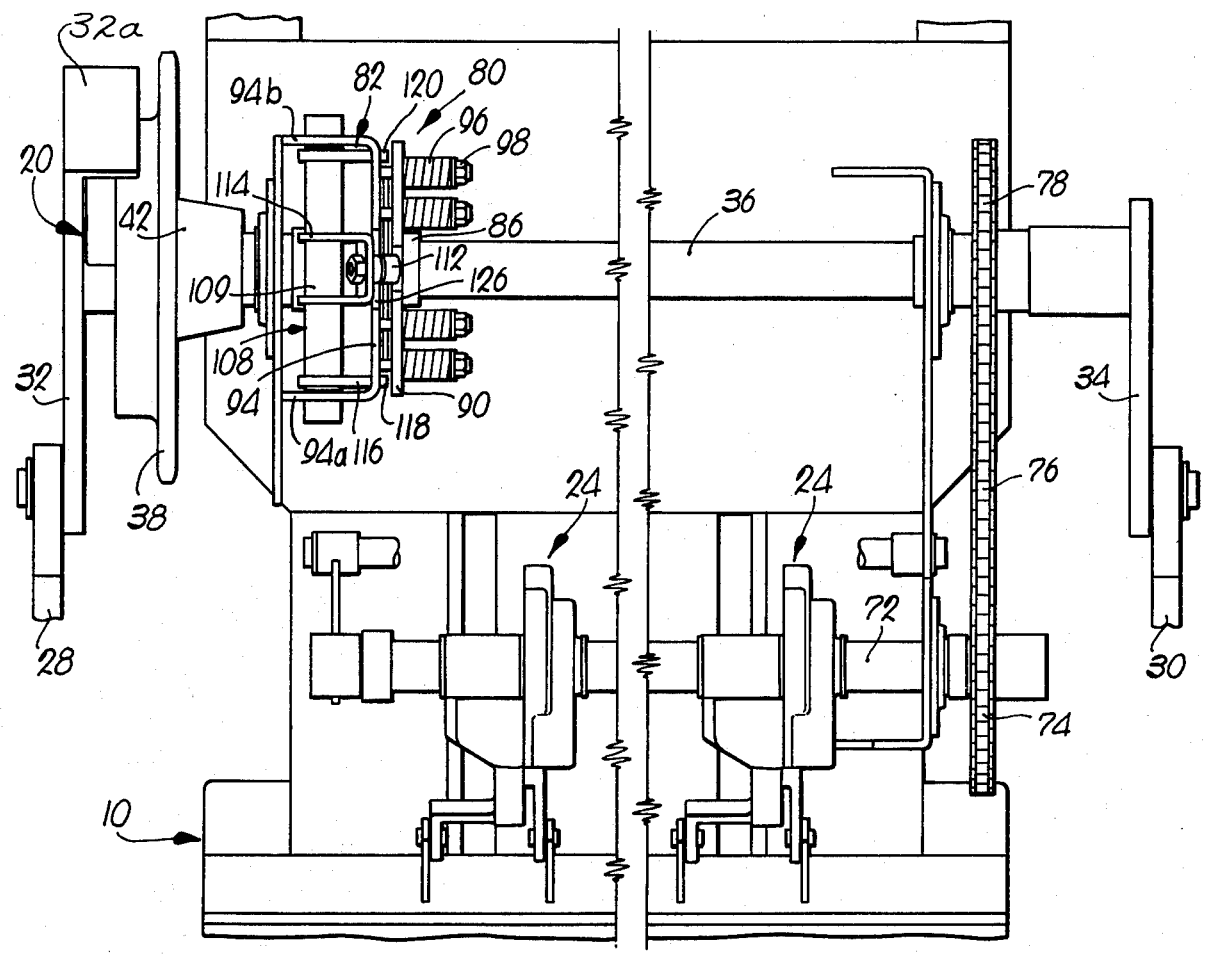
FIG. 1 is a fragmentary, top plan view of a baler utilizing a brake constructed in accordance with the principles of the present invention.

With reference initially to FIG. 5, the baler has a generally fore-and-aft extending bale case 10 supported for over-the-ground travel by ground wheels 12 (only one being shown). Pickup mechanism (not shown) at the front of the bale case 10 lifts crop material from the ground and delivers the same into an upwardly and rearwardly curved loading duct 14 which leads into the bottom of the bale case 10. A stuffer fork (not shown) intermittently loads the accumulating material within the duct 14 upwardly into the bale chamber within case 10, whereupon a plunger 16 packs the loaded charge of crop material rearwardly against one or more previous bales in the chamber. Once a bale of desired length has been produced within the bale case 10, a suitable sensor (not shown, but clearly understood by those skilled in the art) adjacent the rear of the case 10 pulls rearwardly on an actuating rod 18 to trip a clutch 20 and thereby initiate operation of the tying needles 22 and the knotter mechanism 24.

Details of the knotter mechanisms 24 are not necessary to a full understanding of the present invention and will, therefore, be eliminated. Suffice it to point out that the mechanisms 24 may be of many different acceptable designs, capable of tying knots in the opposite ends of twine or twisting together the opposite ends of wire strands. Similarly, details of the needles 22 are not per se important to a full understanding of the principles of the present invention since the needles 22 may also take several different forms compatible with the mechanisms 24. Generally speaking, it is the role of the needles 22 to present strands of wire or twine to the mechanisms 24 after each bale in succession has reached a predetermined size such that the bale can be bound tightly and preparations can be made for initiating binding of the next succeeding bale.

In the illustrated embodiment the needles 22 are supported for swinging movement about horizontal pivots 26 (one only being shown) on the opposite vertical sides of the bale case 10, and the needles 22 travel upwardly across the bale chamber along an arcuate path of travel between their fully lowered position illustrated in solid lines in FIG. 5 (and denoted by the letter "A") and a "full throw" position illustrated in broken lines in FIG. 5 (and designated by the letter "D"). A pair of drive links 28 and 30 extend upwardly and forwardly from cranked connections with the needles 22 on opposite sides of the bale case 10 (see also FIG. 1) and are pivotally joined to respective cranks 32 and 34 that are rigidly attached to opposite ends of a drive shaft 36 spanning the bale case 10 across the top of the latter. Thus, when the shaft 36 is rotated, the needles 22 are operated by the links 28, 30 and the cranks 32, 34.

Whether or not the shaft 36 is rotating at any given point in time is determined by the clutch 20 which, as aforementioned, is triggered by a rearwardly directed pull on the rod 18 from a suitable device (not shown) which senses the length of the bales being produced within the case 10. The clutch 20 does not per se form a part of the principles of the present invention and is of conventional design, but for a full understanding of this invention it will be briefly described as follows.

A relatively large sprocket 38 receives driving power through a downwardly and forwardly extending chain 40 that is, in turn, coupled with a source of such power. The chain 40 and the sprocket 38 may be in constant operation while the needles 22 operate only intermittently, the sprocket 38 having a hub 42 (FIG. 1) on its inner face which contains internal bearings (not shown) that allow the sprocket 38 to rotate relative to the shaft 36. Unless the clutch 20 is engaged, the sprocket 38 does, in fact, normally rotate while the shaft 36 remains idle.

The clutch 20 includes a lever 44 swingably mounted on the inner face of the crank 32 by a pivot 46 and yieldably biased in a counterclockwise direction viewing FIG. 5 by a tension spring 48. One leg 62 of the lever 44 projects radially outwardly beyond the crank 32 in position to engage a trigger 50 swingably mounted by a pivot 52 on the bale case 10, the trigger 50 having a normally upwardly extending arm 54, a normally horizontally and rearwardly extending arm 56, and a third normally downwardly extending arm 58 that is connected to the rod 18. When the trigger 50 is in the position as illustrated in FIG. 5, a roller 60 on the upwardly extending arm 54 is in position to be engaged by the forwardly extending leg 62 of the lever 44. This maintains the lever 44 cocked slightly clockwise viewing FIG. 5 such as to maintain a rearwardly extending leg 64 of the lever 44 downwardly out of engagement with a clutch shoulder 66 on the outer face of the sprocket 38.

When the trigger 50 is tripped counterclockwise by a rearward pull on the rod 18, the roller 60 is moved forwardly out from under the leg 62 which permits the spring 48 to rock the lever 44 counterclockwise and thereby place a roller 68 on the leg 64 in position to be engaged by the shoulder 66. Thereby, rotation of the sprocket 38 is transmitted to the crank 32 and, in turn, to the drive shaft 36 (see FIG. 6 for an illustration of the condition of the components upon rotation through 180° from the starting point illustrated in FIG. 5).

As a result of the counterclockwise tripping of the trigger 50 to clear the lever 44, a roller 70 on the rearwardly extending arm 56 of the trigger 50 becomes rocked up into position to be engaged by a forwardly disposed, transversely extending flange 32a (FIG. 1) on the crank 32 as the latter sweeps downwardly during its rotation. The flange 32a thereby recocks the trigger 50 in a clockwise direction so that the roller 60 is once again in position to be engaged by the leg 62 as the crank 32 completes 360° of rotation. Consequently, as the leg 62 once again comes to rest against the roller 60, the lever 44 is cocked clockwise to swing the roller 68 downwardly out of engagement with the shoulder 66, thereby allowing the latter to continue its rotation with the sprocket 38 and leaving the shaft 36 idle until the clutch 20 is once again engaged.

As illustrated in FIGS. 1 and 5, the knotting mechanisms 24 share a common input shaft 72 that extends substantially across the entire width of the bale case 10 along the top of the latter. The right end of the shaft 32 (viewing FIG. 1) has a drive sprocket 74 entrained by an endless chain 76 that extends forwardly to entrain another sprocket 78 rigid to the right end of the shaft 36. Thus, when the shaft 36 is rotated, the knotting mechanisms 24 are actuated, as well as the needles 22, and such actuations of the knotting mechanisms 24 and the needles 22 are in timed relationship to one another.

Figures 2, 3:
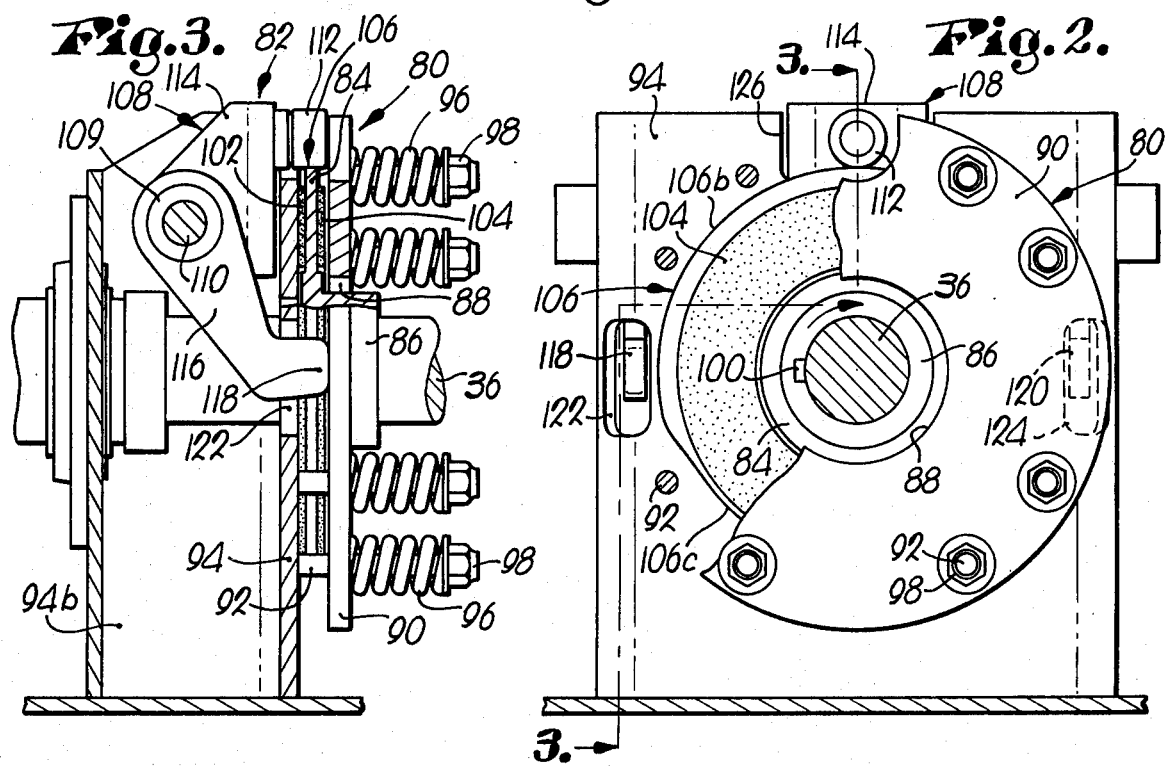
FIG. 2 is an enlarged, elevational view of one side of the brake with parts broken away to reveal details of construction.
FIG. 3 is a fragmentary, cross-sectional view of the brake taken substantially along line 3—3 of FIG. 2.

The shaft 36 adjacent its left end but slightly inboard of the sprocket 38 has a brake 80 associated therewith, along with a control 82 for the brake 80. The brake 80 includes a first member 84 that is keyed to the shaft 36, as illustrated in FIG. 2, for rotation therewith, the member 84 being in the nature of a flat, circular plate having a central hub 86 which extends along the shaft 36 through an enlarged central opening 88 in a second brake member 90 disposed alongside of the first member 84. As with the first member 84, the second member 90 is of platelike construction, but instead of being rotatable with the shaft 36, the circular member 90 is attached by a series of peripheral studs 92 to an upright, rectangular support plate 94 such that the latter holds the member 90 against rotation. However, the studs 92 project for a substantial distance through and beyond the member 90 from the support plate 94 so that the member 90 may be shifted along the studs 92 and the shaft 36 toward and away from the first member 84. Compression springs 96 surrounding the studs 92 are clamped between the outer face of the member 90 and keepers 98 on the outermost ends of the studs 92 to yieldably bias the member 90 toward the member 84. Note in FIG. 2 that the studs 92 are disposed fully radially outwardly of the member 84 such as to provide clearance for the latter during its rotation with the shaft 36.

The key 100 between the shaft 36 and the hub 86 (FIG. 2) permits a limited amount of movement of the member 84 along the shaft 36 while retaining the same for rotation. A pair of friction-increasing, annular discs 102 and 104 are located on opposite faces of the member 84 in concentricity therewith such that the compression springs 96 cause a braking force to be applied between the members 84, 90 and the disc 104, as well as between the plate 94, the member 84, and the disc 102. Such application of the brake 80 retards the rotation of the shaft 36.

The control 82 includes a cam 106 that is integral with the member 84 around the outer peripheral edge thereof. The cam 106 in all circumferential locations thereof projects radially outwardly beyond the discs 102 and 104 and has a number of successive land and valley areas that are consecutively designated by the numbers 106a through 106e, as illustrated in FIG. 4.

The control 82 also includes a follower for the cam 106 in the nature of a rocker 108 that includes an integral sleeve 109 rotatably surrounding a fore-and-aft extending stub shaft 110 (FIG. 3) between the inturned ends 94a and 94b of the upright plate 94. The rocker 108 further includes a single, centrally disposed roller 112 at its upper end 114 and has a bifurcated lower end 116 provided with feet 118 and 120 that project laterally from rigid connections with the sleeve 109 adjacent opposite ends of the latter. The feet 118 and 120 extend through apertures 122 and 124, respectively, in the plate 94 for engagement with the member 90 at points on the latter which are radially outside of the cam 106. The roller 112 projects through a notch 126 in the upper edge of the plate 94 into engagement with the cam 106 such that upon rotation of the latter, the lands and valleys 106a–106e are successively brought into engagement with the roller 112 to push the feet 118 and 120 in a rocking motion against the member 90 with variable amounts of force depending upon whether a land or a valley is beneath the roller 112 at any given point in time.

OPERATION

When the clutch 20 is engaged in the manner earlier explained, the roller 68 of lever 44 is placed in a position to be pushed around the axis of shaft 36 by the shoulder 66 on the sprocket 38, thereby rotating the crank 32 to drive the shaft 36 and, hence, swing the needles 22. In the particular embodiment illustrated, it is contemplated that swinging movement of the needles 22 from position A in FIG. 5 to position D in FIG. 5 and then return from position D to A will require two successive cycles of the plunger 16. That is, the first part of the needle cycle will be carried out during the last half of one plunger cycle and the last half of the needle cycle will be carried out through the first half of the next succeeding plunger cycle. It is also contemplated that the plunger 16 may remain idle for a short time between its cycles, and, thus, there arises the need to stop and then start the needles 22 in mid-cycle. While the following explanation is made with such intermittent plunger operation and mid-cycle needle stoppage in mind, it is to be understood that the principles of the present invention are not limited to that specific type of operation and enjoy equal utility in situations where the plunger is continuously reciprocating such that the tying needles stop only at the completion of a fully cycle of operation.

When the shoulder 66 makes engagement with the roller 68 such as to begin rotation of the shaft 36, the follower roller 112 and the cam 106 are in the relationship as illustrated in FIG. 4 wherein the roller 112 is behind a rather abrupt land area 106a. As the shaft 36 rotates counterclockwise viewing FIG. 4, the land 106a is brought under the roller 112 such as to swing the rocker 108 counterclockwise about the axis of stub shaft 110 (viewing FIG. 3) and thereby push the brake member 90 outwardly along the studs 92 against the force of the springs 96. This releases the brake 80 because the frictional force between members 84, 90 and the friction disc 104, plus that between the member 84, the plate 94 and the friction disc 102 is lessened. Consequently, the needles 22 are substantially unretarded as they begin their upward movement from position A in FIG. 5.

As the shaft 36 continues to rotate in a counterclockwise direction, the next land area 106b is brought under the roller 112, and since the area 106b has only a slightly smaller radius than the area 106a, the brake 80 remains released such that the needles 22 are substantially unretarded as they move up to position B in FIG. 5. At this point, the plunger 16 may pause in its operating cycle, thereby temporarily halting further operation of the drive chain 40 and, hence, the shaft 36, even though the clutch 20 remains engaged. When the plunger 16 is once again activated, the land area 106b continues to be brought under the roller 112 and the needles 22 continue to be raised substantially without braking resistance until position C is reached.

At position C the valley area 106c is brought under the roller 112 such that the rocker 108 is allowed to swing in a clockwise direction viewing FIG. 3. This permits the springs 96 to urge the member 90 toward the member 84, thereby reapplying the brake 80. Thus, from position C to position D (the latter being the uppermost position of the needles 22) the brake 80 is applied to retard the needles 22.

As the valley area 106c continues to be brought under the roller 112, the brake 80 remains applied such that the needles 22 begin their downstroke from position D in a retarded condition. As the needles approach position E, land area 106d is brought under the roller 112 such that the rocker 108 is once again swung counterclockwise viewing FIG. 3 to release the brake 80. The brake 80 remains released from position E to position F such as to enable gravity to assist in the rapid removal of the needles 22 from the bale chamber, at which point the valley area 106e comes under the roller 112 to cause the brake 80 to be reapplied.

From position F through position G and thence to position A, the brake 80 remains applied to retard the needles 22 as they return to their "home" position below the bale case 10, as illustrated in solid lines in FIG. 5.

At substantially the same time that the needles 22 approach position A from position G, the clutch 20 becomes disengaged as the forwardly projecting leg 62 of lever 44 engages the roller 60 of trigger 50 to rock the roller 68 downwardly away from the shoulder 66. Thus, although the plunger 16, the chain 40 and the sprocket 38 may continue in operation, the shaft 36 becomes idled with the brake 80 applied.

It is to be noted that the action of the shoulder 66 against the lever 44 and, hence, against the crank 32, is one of pushing only. For example, FIG. 6 illustrates clearly the fact that the shoulder 66 does not capture the roller 68, but only moves into position behind the same and remains in such relationship throughout the entire revolution of the sprocket 38. Thus, the shoulder 66 is unable to prevent the relatively massive needles 22 from moving ahead of the shoulder 66 when the latter has come to a halt and the momentum of the needles 22 urges them to continue, or when gravity takes over to swing the needles 22 downwardly at a faster rate than the peripheral speed of the shoulder 66. Consequently, it is left to the brake 80 to provide the necessary retarding force against the undesired needle movement at such time; and while the brake 80 is fully capable of applying such force at the necessary points throughout the operating cycle, nonetheless, by virtue of the present invention that force is applied only at such times as it is specifically necessary or desirable, and not on a continuous basis as has heretofore been the common practice.

Having thus described the invention, what is claimed as new and desired to be secured by Letters Patent is:

1. In a baler having reciprocable structure used in the production of a finished bale:
   a releasable brake for retarding movement of said structure when the brake is applied; and
   a control responsive to said movement of the structure for applying and releasing the brake at predetermined points along the path of travel of the structure,
   said control including a cam shiftable during movement of said structure and a follower operable by said cam during said shifting of the latter,
   said brake being normally applied, said follower being operable to release the brake when actuated by said cam.

2. In a baler as claimed in claim 1 wherein said control further includes means for yieldably biasing the brake toward said applied condition thereof.

3. In a baler having reciprocable structure used in the production of a finished bale:
   a releasable brake for retarding movement of said structure when the brake is applied; and a control responsive to said movement of the structure for applying and releasing the brake at predetermined points along the path of travel of the structure, said brake including a pair of frictionally cooperable members mounted for relative movement toward and away from one another to apply and release the brake, respectively, one of said members being operably coupled with said structure for rotation relative to the other member during said movement of the structure.

4. In a baler as claimed in claim 3, wherein said control includes a cam rotatable with said one member and a follower disposed for actuation by the cam to effect said relative movement of the members.

5. In a baler as claimed in claim 4, wherein said cam is located on the outer peripheral surface of said one member.

6. In a baler as claimed in claim 4, wherein said follower includes a rocker having one end thereof on one side of its axis of swinging movement engageable with said cam and the opposite end thereof on the opposite side of said axis disposed to relatively shift said members.

7. In a baler as claimed in claim 6, wherein said cam is located on the outer peripheral surface of said one member.

8. In a baler as claimed in claim 6, wherein said opposite end of the rocker is engageable with said other member for shifting the latter away from said one member.

9. In a baler as claimed in claim 8, wherein said control further includes means for yieldably biasing said other member toward said opposite end of the rocker.

10. In a baler as claimed in claim 9, wherein said members are provided with friction-increasing means theerebetween.

11. In a baler as claimed in claim 9, wherein said structure includes a needle used in binding the bale, said needle being mounted for reciprocal swinging movement.

12. In a baler having a needle swingable back and forth across the bale chamber for intermittently presenting a binding strand to knotting mechanism on the side of the chamber remote from the needle:

a drive shaft coupled with said needle;

a clutch selectively operable to connect said shaft with a source of driving power to effect said swinging of the needle;

a first brake member mounted for rotation with said shaft;

a second brake member shiftable along said shaft toward and away from said first member and held against rotation with the latter, said members being cooperable when shifted toward one another to retard rotation of said shaft;

a cam on said first member and rotatable therewith; and a follower disposed for actuation by said cam and operable engagement with said second member for shifting the latter away from said first member at predetermined intervals in response to rotation of the cam.

13. In a baler as claimed in claim 12; and means for yieldably biasing said second member toward said first member.

14. In a baler as claimed in claim 12; and friction-increasing means between and engageable with said members.

15. In a baler as claimed in claim 12, wherein said cam is integral with said first member at the outer periphery of the latter.

16. In a baler as claimed in claim 15, wherein said follower includes a rocker swingable about an axis intermediate its opposite ends, one end of said rocker being disposed for engagement with said cam and the opposite end of the rocker being disposed for engagement with said second member.

17. In a baler as claimed in claim 12, wherein said clutch is disposed to only push said shaft through the latter's cycle of rotation.

18. In combination with a rotary shaft:

a first brake member mounted for rotation with said shaft;

a second brake member held against rotation with the shaft but shiftable along the latter toward and away from said first member, said members being cooperable when shifted relatively toward one another to retard rotation of the shaft;

a cam mounted on said first member for rotation therewith; and a follower disposed for actuation by said cam to effect said shifting of the second member away from said first member at predetermined intervals in response to rotation of the cam.

19. In a combination as claimed in claim 18; and means for yieldably biasing said second member toward said first member.

20. In a combination as claimed in claim 18; and friction-increasing means between and engageable with said members.

21. In a combination as claimed in claim 18, wherein said cam is integral with said first member at the outer periphery of the latter.

22. In a combination as claimed in claim 21, wherein said follower includes a rocker swingable about an axis intermediate its opposite ends, one end of said rocker being disposed for engagement with said cam and the opposite end of the rocker being disposed for engagement with said second member.

* * * * *